United States Patent [19]

Lins et al.

[11] Patent Number: 4,902,087
[45] Date of Patent: Feb. 20, 1990

[54] FIBER OPTIC BYPASS SWITCH

[75] Inventors: Stanley J. Lins, Bloomington; David L. Fleming, Edina, both of Minn.

[73] Assignee: Unisys Corporation, Blue Bell, Pa.

[21] Appl. No.: 245,593

[22] Filed: Sep. 19, 1988

[51] Int. Cl.⁴ .................................................. G02F 1/11
[52] U.S. Cl. .................................... 350/96.13; 350/358
[58] Field of Search ................. 350/358, 96.12, 96.13, 350/96.14

[56] References Cited

U.S. PATENT DOCUMENTS

| | | | |
|---|---|---|---|
| 4,332,441 | 6/1982 | Margolis | 350/358 |
| 4,390,247 | 6/1983 | Freyre | 350/358 |
| 4,443,066 | 4/1984 | Freyre | 350/358 |
| 4,684,828 | 8/1987 | Sommargren | 350/358 |
| 4,736,382 | 4/1988 | O'Meara | 350/358 |
| 4,759,613 | 7/1988 | Fox | 350/358 |

Primary Examiner—William L. Sikes
Assistant Examiner—Akm E. Ullah
Attorney, Agent, or Firm—Seymour Levine; Albert B. Cooper; Glenn W. Bowen

[57] ABSTRACT

An optical bypass switch includes a variable diffraction element responsive to acoustical signals operable to couple light signals incident to first and second input ports to first and second output ports, respectively, for a first diffraction index and from the first and second input ports to the second and first output ports, respectively, for a second diffraction index. Acoustical signals are provided by an electro-acoustic transducer coupled to the variable diffraction element which establishes acoustical signals in response to acoustical signals coupled thereto.

16 Claims, 4 Drawing Sheets

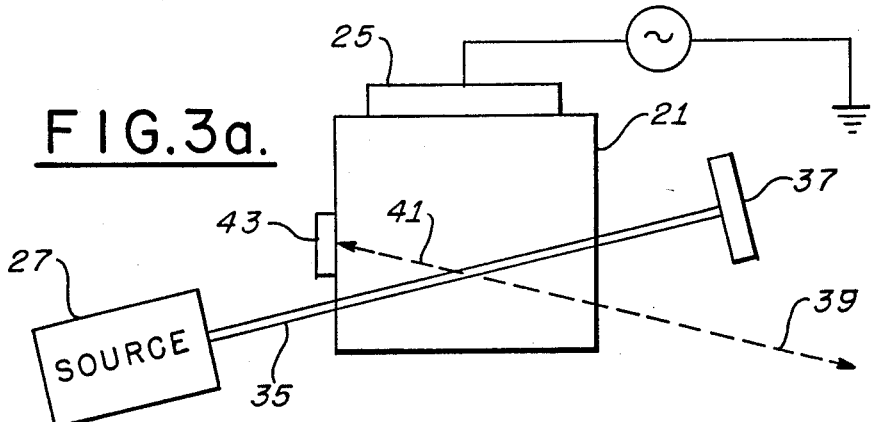
FIG.3a.
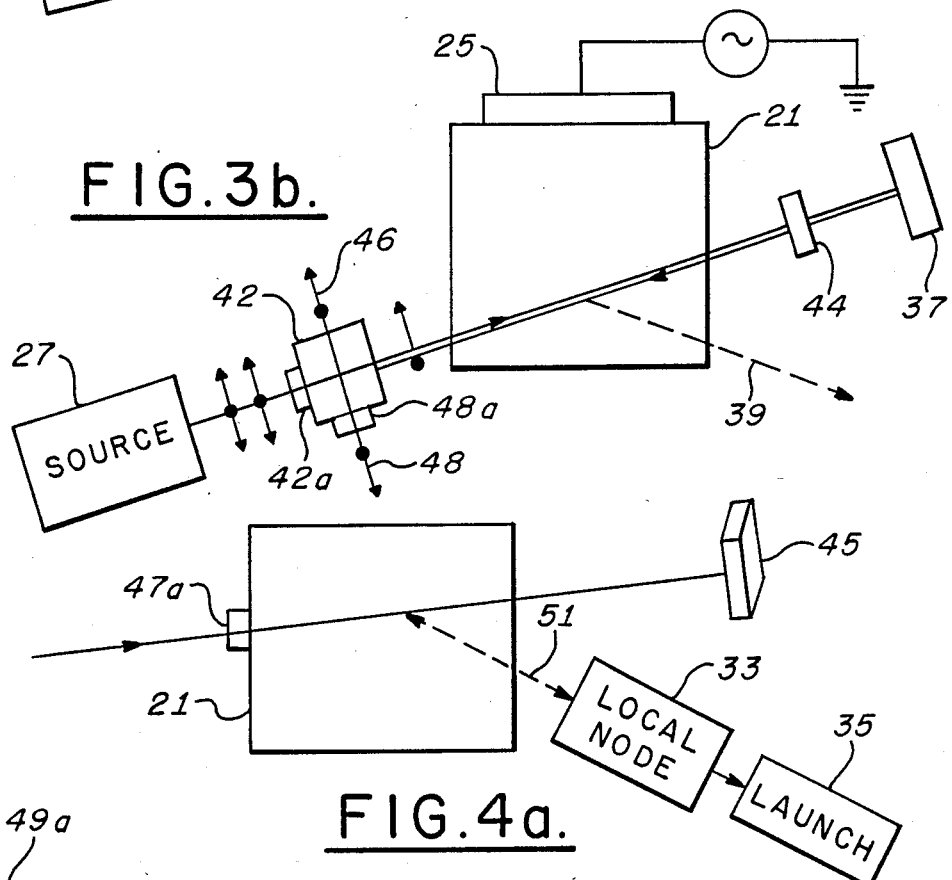
FIG.3b.
FIG.4a.
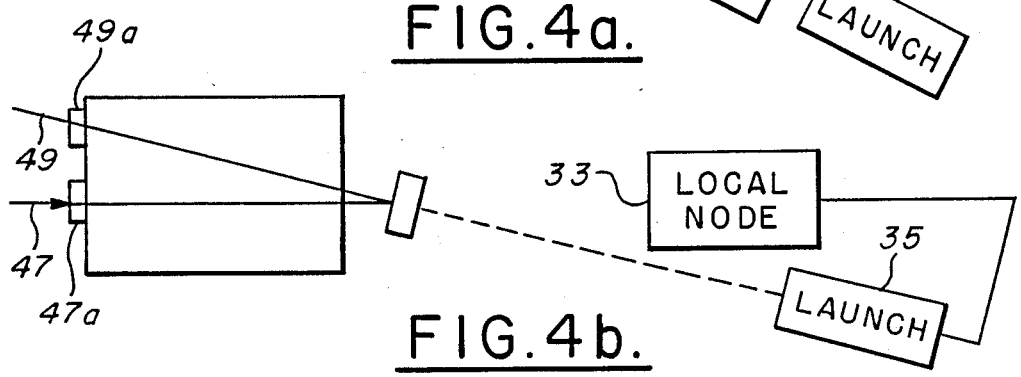
FIG.4b.

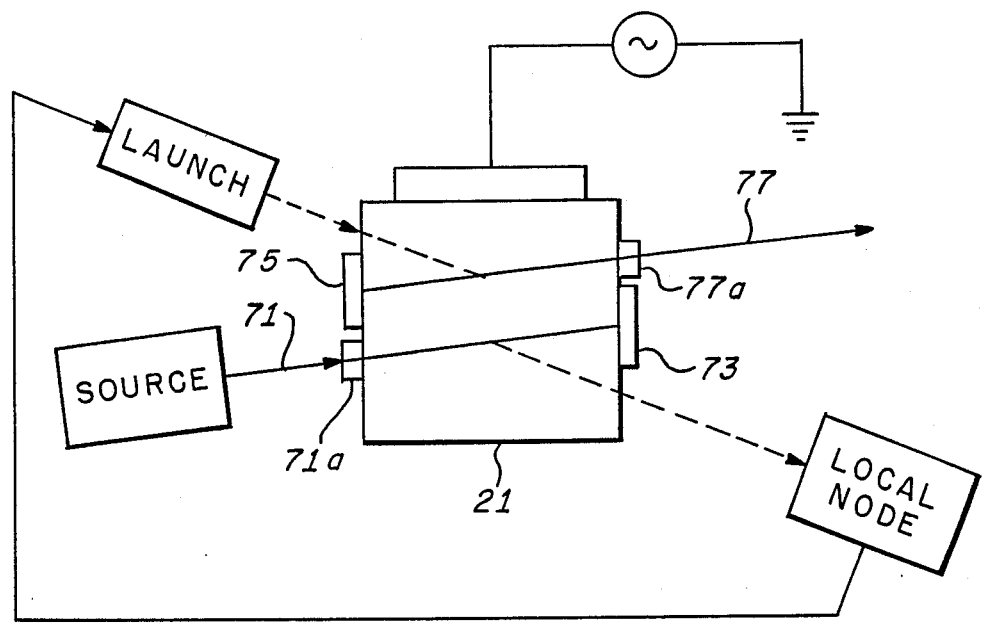
F I G. 6.
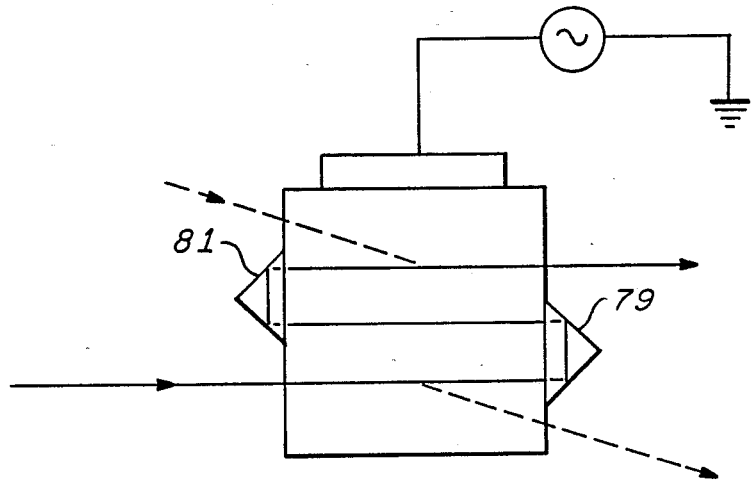
F I G. 7.

FIBER OPTIC BYPASS SWITCH

BACKGROUND OF THE INVENTION

1. Field of the Invention

The invention pertains to switching optical signals and more particularly to switches for bypassing a defective data station in a serial network of data stations wherein data is transmitted via optical signals.

2. Description of the Prior Art

High information transmission capacity, immunity to electromagnetic interference, and freedom from ground loop problems ideally suit optical transmission systems for linking distributed computers, computer controlled industrial components, and other data transmission systems. These optical transmission systems utilize optical fibers to serially link a multiplicity of optical repeater stations. A power failure at one of the serial link stations, however, may interrupt the data chain and cause the entire system to fail. To prevent such a catastrophe, a fail safe optical switch is employed at each repeater which operates to bypass that station when a fault occurs, as for example, a power loss. These fail safe switches must possess low insertion loss properties, and provide high isolation between the input and output optical fibers during the "Power On" mode. Many such networks have hundreds, if not thousands of data stations each requiring a bypass switch, making the cost of the by-pass a major factor.

Conventionally, the optical switches utilized have been mechanical in nature. Mechanical switches, though relatively inexpensive, inherently include moving parts and generally require high driving power. These moving parts are subject to wear, abrasion, fatigue and other mechanical stresses and as a consequence are themselves prone to failure.

Optical switches, utilizing a liquid crystal material, as the optical signal direction control mechanism have been proposed. At present, however, these proposed liquid crystal switches are both expensive and difficult to mass produce. As proposed, these devices employ a series of triangular prisms, having optically flat surfaces. These prisms are difficult to manufacture and represent the bulk of the manufacturing costs of the switch. Further manufacturing difficulty arises due to the requirement that the optically flat bases of the prism be parallel and laterally aligned to insure that the path of the light beams passing therethrough maintain a prescribed path.

Other types of optical switches in the prior art utilize a Faraday rotator comprising YIG crystal to effect polarization rotation of the optical signal and a polarization separator to accomplish the desired switching. These switches exhibit excessive inertia due to the wiring in an electromagnet required to establish the necessary magnetic field about the YIG to produce the polarization rotation. Additionally, large amounts of electrical current must pass through the coils to establish the required magnetic field. The current may be reduced somewhat with additional turns of wire, but this adds to the inertia of the switch. Further, the YIG crystal is constructed as a slab optical waveguide and presents an interface problem with the optical fibers of the data system.

Another bypass switch of the prior art utilizes PLZT wafers to which an electrical voltage is applied to effectuate a polarization rotation. This switch, as do the other polarization sensor devices, requires polarization beamsplitters to direct the polarized light, and collimating and focussing lenses for interfacing the PLZT wafers with the optical fibers. In addition to requiring the high voltage to provide the necessary polarization rotation, the PLZT wafers are difficult and expensive to manufacture. Further, the necessary electrode through which the wafer voltage is applied must be positioned on the wafer clear of the light path, adding to the cost and size of the manufactured switch.

SUMMARY OF THE INVENTION

An optical switch constructed according to the principles of the present invention includes an acoustic sensitive device, such as a Bragg cell, having an index of refraction that is variable in accordance with an applied acoustic signal. This acoustic signal may be provided to the device by an electroacoustic transducer responsive to an electrical signal coupled thereto. Prior to the application of the electrical signal, light signals incident to an input port on one side of the device exit from an output port on the other side which is in-line with the input port. When an electrical signal is applied, the transducer provides bulk acoustic waves that fill the device and refract the light to a second output port, the position of which is determined by the refracted index change caused by the bulk acoustic waves. If two input ports are provided, the switch may be utilized as a bypass switch where, in the unenergized mode, light incident to the first input port is coupled to a first output port in alignment therewith, while in the energized mode, light incident to the first input port is coupled to a second output port displaced from the first output port. A second input port may be positioned adjacent to the first input port in such a manner that when the device is energized, light incident to the second input port is refracted to the first output port.

A bypass switch as described above utilizing a Bragg cell will, in the energized mode, couple approximately 90% of the light from the first input port to the second output port, with the remaining 10% being coupled to the first output port. Thus, only 10 dB of isolation is provided between the two output ports. In a second embodiment of the invention, a reflector is positioned at what would be the first output port in such a manner that the light incident from the first input port is reflected therefrom to establish the first output port on the same side of the device as the first input port. In this manner, when the Bragg cell is energized, 90% of the light energy exits the second output port while the 10% incident to the reflector is reflected therefrom to be refracted once again and couples 1% of the light originally incident to the first input port to the first output port, thereby providing approximately 20 dB of isolation between first and second output ports. Additional isolation may be provided between the first and second output ports by positioning a reflector at what would be the first output port with but a single reflection to reflect the light incident thereto from the first reflector to exit the Bragg cell at a first output port on a side opposite that of the first input port, thereby providing a second reflection. Such a second reflection provides an isolation between the first and second output ports of approximately 30 db. Further additional isolations may be provided by properly positioning additional mirrors along the sides of the Bragg cell.

Other features of the invention will become apparent from the following description and the accompanying drawings which illustrate, as non-limitative examples, preferred embodiments thereof.

BRIEF DESCRIPTION OF THE DRAWINGS

FIG. 3a is a block diagram of a switching device operable in accordance with the principles of the invention which is useful in explaining an improvement over the embodiment of FIG. 2.

FIG. 3b is a block diagram of a second embodiment of the invention.

FIGS. 4a and 4b are block diagrams of a first preferred embodiment.

FIG. 6 is a block diagram of a second preferred embodiment of the invention.

FIG. 7 is a block diagram of a variance of the preferred embodiment of FIG. 6.

DESCRIPTION OF THE PREFERRED EMBODIMENTS

Figure 1:
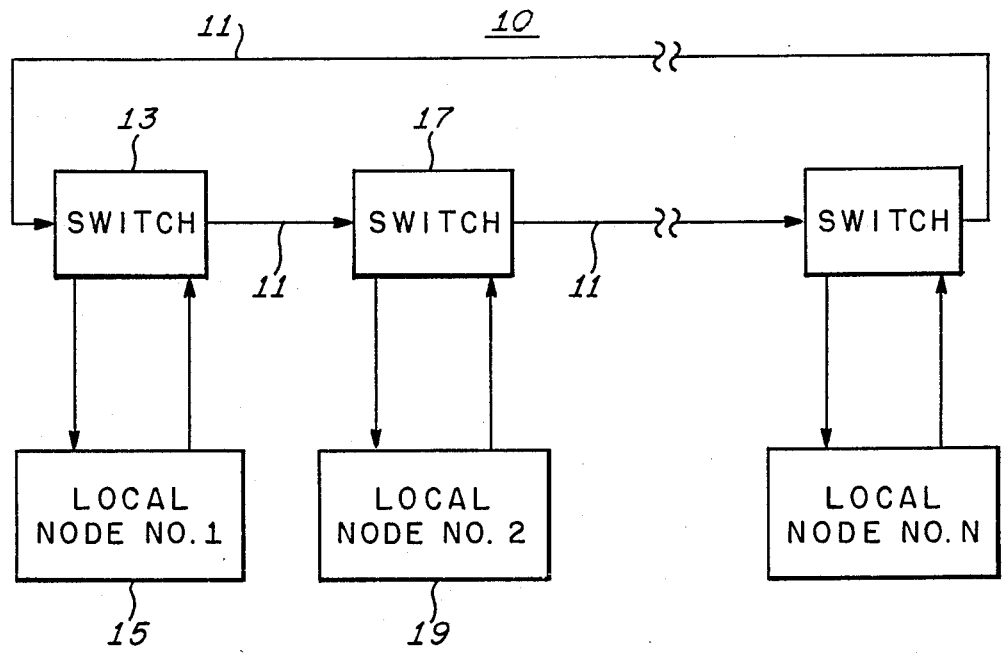
FIG. 1 is a block diagram of a Local Area Network illustrating the switch coupling to the optical transmission lines of the local nodes.

A single loop of a ring type Local Area Network (LAN) 10 is shown in FIG. 1. Optical signals traversing the loop 11 via optical fibers are incident to a switch 13 wherefrom, with the switch 13 in the energized state, they are directed to a local node 15 wherein the optical signal is demodulated and the data extracted therefrom processed and retransmitted to the switch 13, to be coupled to the loop 11 and incident to the switch 17 at local node 19. Switch 17 and local node 19 cooperate in the same manner as the switch 13 and local node 15 to provide optical signals along the loop 11. This switching, demodulation and modulation process continues in a serial manner as the optical signals traverse the loop. If a local node failure occurs, switches at that node are deenergized so that the optical signals bypass the local node and continue to propagate along the loop 11 to be incident to a subsequent switch. In this manner, a failure at one local node does not adversely affect the entire network.

Figure 2:
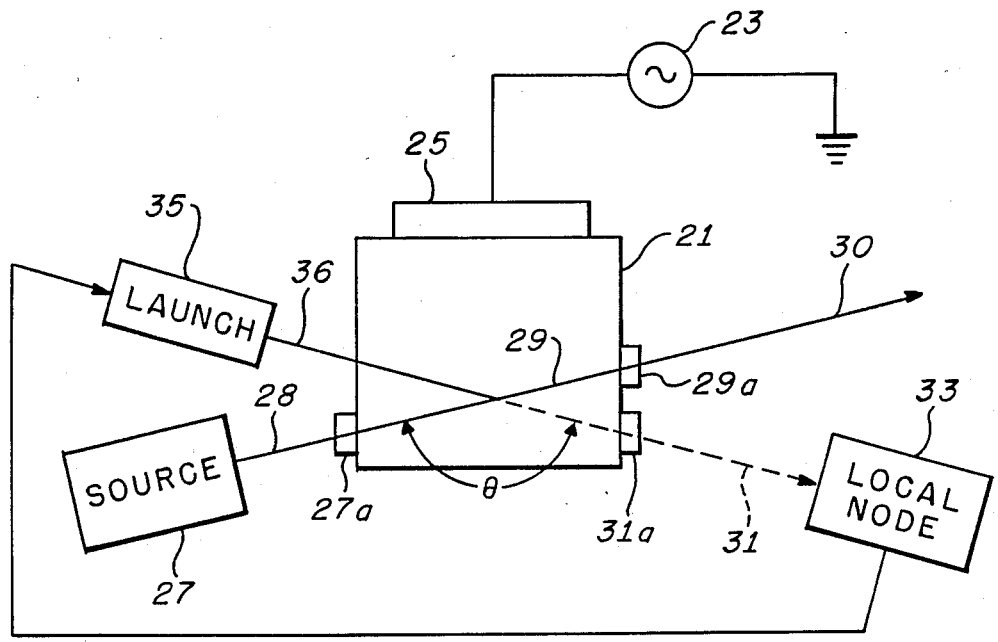
FIG. 2 is a block diagram of one embodiment of the invention.

A switch suitable for performing the bypass function is illustrated in FIG. 2. A variable index of refraction device 21 responsive to acoustic signals, such as a Bragg cell, is coupled to a source of electrical signals 23 through an acoustic transducer 25 wherefrom a bulk acoustic wave is launched into the Bragg cell in response to an electrical signal from the source 23. This bulk acoustic wave causes layers of high and low index of refraction in the cell, thereby establishing a diffraction grating. In the absence of the bulk acoustic wave, a light beam in an optical waveguide, such as an optical fiber 28, from a light source 27 entering the cell 21 via a first input port 27a propagates therethrough along a path 29 and may be coupled therefrom via a first output port 29a to an optical fiber 30 in the loop 11.

As stated previously, an electrical signal on the electrical source 23 coupled to the transducer 25 causes a bulk acoustic wave to propagate through the Bragg cell 21, thereby causing the diffraction grating. A monochromatic light signal from the source 27 will therefore be diffracted from the path 29 at an angle $\theta$ to propagate in optical fiber 31 and exit at a second output port 31a of the Bragg cell 21 to be incident to the local node 33. Light signals from local node 33 are then coupled to an optical launching device 36 wherefrom an optical signal launched along a ray path to an input port of the Bragg cell 21, is diffracted therein to propagate along the ray path 29 and exit at the output port to the loop 11. Should the local node lose power, or a fault occur therein, power to the electrical source 23 is shut off, removing the bulk acoustic wave from the Bragg cell, eliminating the diffraction grating, and thereby permitting the monochromatic light to propagate therethrough along the path 29 to exit at the output port and couple to the loop 11.

When the monochromatic light is diffracted from the ray path 29 to the ray path 31, the light intensity along the ray path 31 is approximately 90% of the light intensity originally propagating along the ray path 29, while 10% continues to propagate along the ray path 29. This 10% is coupled to the loop 11 without being processed at the local node 33, appearing as noise on the LAN fiber optic ring. Such noise may lower the bit-error rate to a value that is unacceptable for most applications. A significant leakage reduction can be realized by causing the undiffracted ray path to traverse the Bragg cell twice before exiting at the loop port of the device.

Refer now to FIG. 3a. When the Bragg cell 21 is not energized, monochromatic light from light source 27 incident to the Bragg cell via an optical fiber traverses the Bragg cell 21 to be incident to a mirror 37, or other reflecting device, positioned to reflect the light beam along the path that retraverses the Bragg cell 21 to exit at the original port of incidence. When an electrical signal is applied to the transducer 25, the incident light is diffracted to exit the device along the path 39. In this situation, the 10% of the incident light that continues to traverse the initial path is incident to the mirror 37 and reflected therefrom to the Bragg cell 21 switch that 9% of the original incident light is emitted from the device in a harmless manner along a path 41. To prevent radiation of this light, a light absorbing element 43 may be positioned at the exiting port, the residual 10% of the reflected light, which is but 1% of the original incident light continues along the ray path to exit at the original incident port. In this manner, the leakage from the device has been reduced to approximately 20 dB.

Since the incident and reflected light traversing the Bragg cell 21 in the unenergized state propagate along the same path, the device of FIG. 3a requires an element at the initial incident port to separate the incident and reflected beams. With this arrangement the incident and reflected beams may be separated by positioning a polarizing beamsplitter (PBS) 42 between the source 27 and the Bragg cell 21 and a quarter waveplate (QWP) 44 between the Bragg cell 21 and the reflector 37. Unpolarized light incident to the PBS 42 at input port 42a from the source 27 is split to permit light at one component of polarization, as for example the component in the plane of the paper, to pass through the PBS 42 along the incident propagation path, while light at a polarization component perpendicular to the one component, for the example given, the component perpendicular to the plane of the paper, is refracted along a path 46 perpendicular to the incident path. Light propagating through the Bragg cell 21 passes through the QWP 44, wherefrom it emerges as circularly polarized, to be reflected from the mirror 37. The reflected light passes through the QWP 44 and emerges therefrom as light at the perpendicular polarization to be incident to the PBS 42 and refracted therein to emerge therefrom at output port 48a for coupling to an optical fiber 48. Though this arrangement separates the incident and reflected beams, 50% of the incident unpolarized light is lost.

An arrangement that preserves the light intensity and does not require additional components is shown in FIG. 4a. A mirror 45 positioned as shown in FIG. 4a is oriented such that the normal thereto does not lie along the incident path 47 of a beam entering the cell at an input port 47a thereby reflecting light incident thereto along a path in the plane of incidence, which for the configuration shown in FIG. 4a, is perpendicular to the paper and shown in FIG. 4b. Reflected light in the unenergized state, as shown in FIG. 4b, is coupled to an optical fiber via output port 49a. When the Bragg cell is energized, the monochromatic light is diffracted along the ray path 51 towards the local node and a regenerated light signal is coupled from the launcher to be incident to the Bragg cell at an input port, wherefrom it is diffracted to propagate along the propagation path 49 to emerge at output port 49a. In this manner, the unenergized input and output ports for the monochromatic beam are easily separated.

Figure 5A:
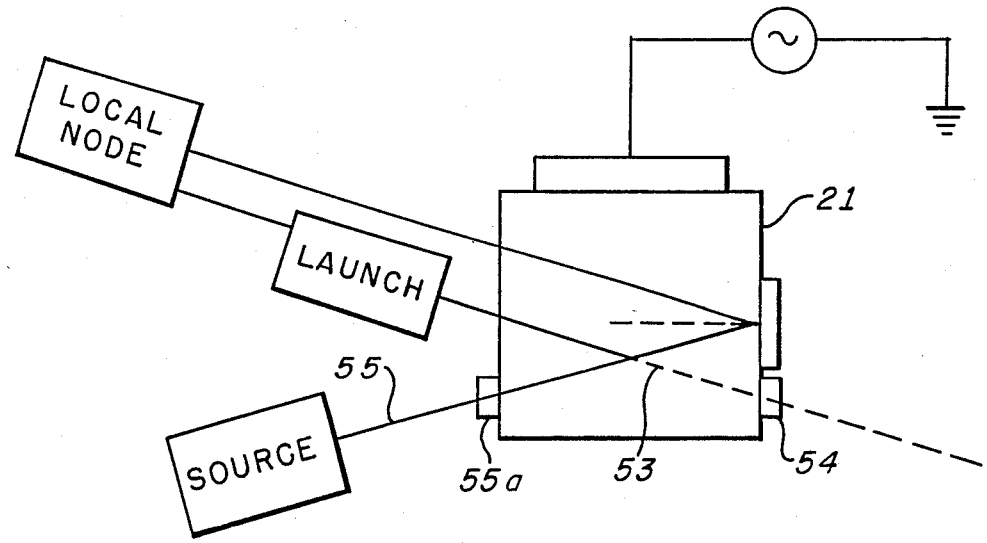
FIGS. 5a and 5b are block diagrams of preferred embodiments of the invention similar to that of FIGS. 4a and 4b.
Figure 5B:
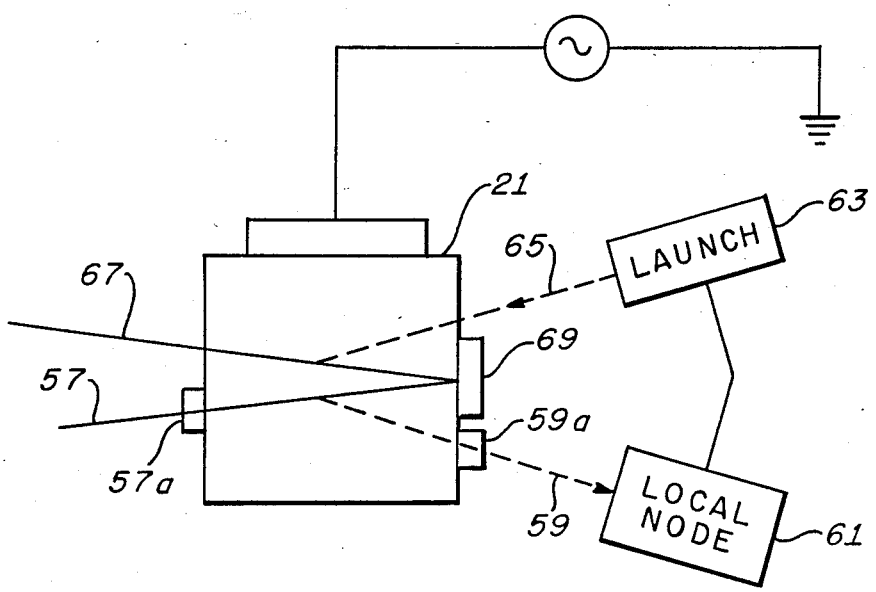

A device of the type shown in FIGS. 4a and 4b wherein the light incident to the switch is coupled to the local node when the Bragg cell is unenergized is shown in FIG. 5a. In this device, an optical signal launched from the local node traverses the ray path 53 to exit at an output port 54 coupled to the loop. Monochromatic light entering from the loop from optical fiber 55 at an input port 55a, when the Bragg cell 21 is energized, is diffracted along the ray path 53 to exit at the loop output port 54. It should be apparent that the mirror-Bragg cell configuration shown in FIG. 5a may be arranged to couple optical signals incident to the Bragg cell 21 from the loop to a local node when the Bragg cell is in the energized state and to by-pass the node when it is in the unenergized state. Such an arrangement is shown in FIG. 5b. When the Bragg cell is in the energized state, light incident from the loop along a path 57 at input port 57a is diffracted to a path 59 and coupled from an output port 59a to the local node 61. Signals emitted from the launcher 63 at the local node are coupled to a path 65 and diffracted therefrom to a path 67, along which signals reflected from a mirror 69 adjacent the Bragg cell 21 propagate when the Bragg cell 21 is in the unenergized state, and exit the cell at an output port 67a.

Additional isolation between the input and the output ports of the optical switch may be achieved with multiple reflections of the incident light signal when the Bragg cell is in the unenergized state, as shown in FIG. 6. Light signals incident to the Bragg cell in the unenergized state propagating through an optical fiber 71 to an input port 71a are reflected from a first mirror 73 to a second mirror 75 to exit at an output port 77a to an optical fiber 77. This additional transversal through the Bragg cell increases the isolation between the input and output ports by approximately 10 db, thereby providing an isolation in the order of 30 db. In the energized state, the incident signals of the Bragg cell are diffracted as described previously.

Reflecting devices other than mirrors may be employed in each of the switches previously described. As, for example, FIG. 7 illustrates the use of 45° prisms 79 and 81 which provide multiple traversals through the Bragg cell in the unenergized state. The operation of the switch in the energized state for this configuration is unaltered from that previously described.

Though the invention has been described in terms of an optical by-pass switch, those skilled in the art will recognize that it may operate as a highly efficient optical modulator wherein the zero order beam is modulated. Bragg cell modulators generally utilize the first order diffracted beam to provide positive modulation. The zero order, undiffracted beam, is utilized when high transmission efficiency is desired. This provides a negative modulation which yields a modulation contrast ratio that does not exceed 10:1, a ratio easily exceeded by multiple transitions of the Bragg cell established by the invention. Further, the 90% diffraction efficiency realized with the above-described configuration easily exceeds the 50% to 60% diffraction efficiency obtained with prior art optical modulators.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An optical switching device comprising:
   means for applying electrical signals;
   means responsive to said electrical signals for providing acoustical signals; and
   switch means operable in first and second modes in response to said acoustical signals for coupling light signals from a first input port to a first output port in said first mode and for coupling light signals from said first input port to said second output port and from said second input port to said first output port in said second mode.

2. The optical switching device of claim 1 wherein said switch means includes means constructed and arranged for reflecting light signals incident thereto along a first propagation path from said first input port to propagate along a second propagation path to said first output port.

3. The optical switching device of claim 2 wherein said switch means includes refracting means responsive to said acoustical signals for providing a variable refractive index and wherein said reflecting means are positioned adjacent sides of said refracting means.

4. The optical switching device of claim 3 wherein said reflecting means is a reflector positioned adjacent one surface of said refracting means and said first output port is adjacent a surface opposite said one surface.

5. The optical switching means of claim 3 wherein said switch means further includes:
   means positioned adjacent said refracting means having said first input port on a first surface and said first output port on a second surface for propagating light at a first polarization from said first input port to said diffracting means and for refracting light at a second polarization perpendicular to said first polarization incident thereto from said diffracting means to said first output port; and
   means positioned between said refracting means and said reflecting means for converting light at said first polarization incident thereto from said refracting means to circularly polarized light and converting circularly polarized light incident thereto from said reflecting means to light at said second polarization.

6. The optical switching device of claim 4 wherein said reflector is a mirror.

7. The optical switching device of claim 4 wherein said reflector is a prism.

8. The optical switching device of claim 2 wherein said switch means includes refracting means responsive to said acoustical signals for providing a variable refractive index, said reflecting means being positioned adjacent sides of said refracting means for reflecting light incident thereto from said refracting means to a plane other than that defined by a ray path of said light signal and a normal to a surface of said refracting means adjacent to said reflecting means.

9. The optical switching device of claim 3 wherein said reflecting means includes a first reflector positioned adjacent a first surface of said refracting means and a second reflector positioned adjacent a second surface opposite said first surface in such a manner that optical signals incident to said first reflector are reflected to said second reflector and therefrom to said first output port.

10. The optical switching means of claim 9 wherein said first and second reflectors are mirrors.

11. The optical switching means of claim 9 wherein said first and second reflectors are prisms.

12. The optical switching means of claim 1 wherein said acoustic signal means comprises transducer means for producing said acoustic signals in response to electrical signals coupled thereto.

13. An optical modulator comprising:
   means for applying electrical signals;
   means responsive to said electrical signals for providing acoustical signals;
   refracting means operable in first and second modes in response to said acoustical signals for coupling light signals from an input port to a reflecting port in said first mode and for coupling light signals from said input port to a first output port in said second mode; and
   means positioned at said reflecting port for reflecting light signals from said reflecting port to a second output port.

14. The optical modulator of claim 13 wherein said reflecting port is on one surface of said diffracting means and said second output port is adjacent a surface opposite said one surface.

15. The optical modulator of claim 14 wherein said reflecting means is a mirror.

16. The optical modulator of claim 14 wherein said reflecting means is a prism.

* * * * *